May 26, 1931.    J. W. SMITH    1,807,179
PROPELLER HUB
Filed July 24, 1928
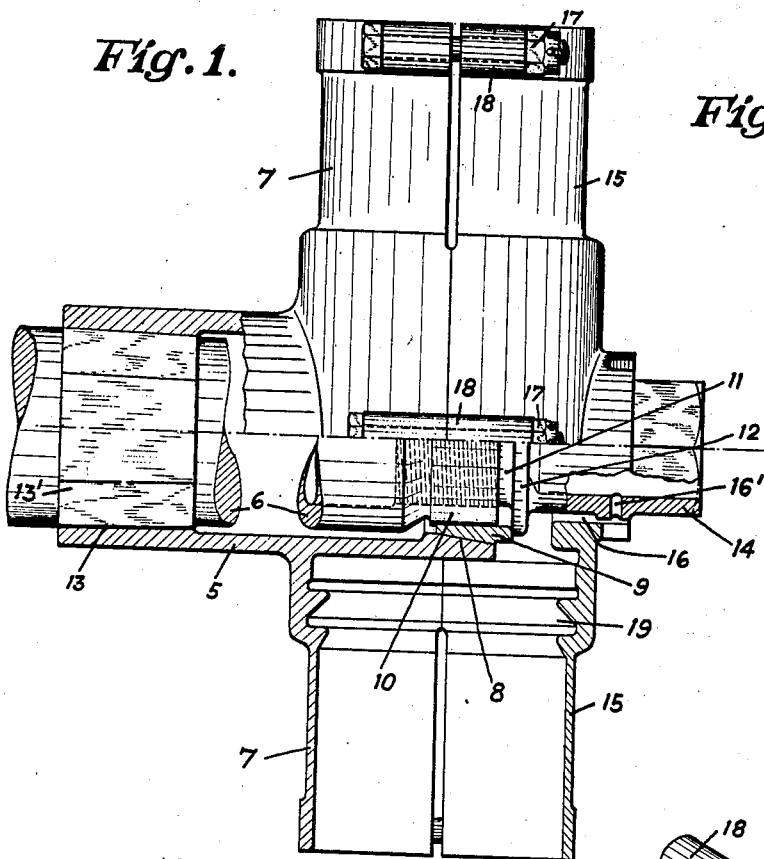
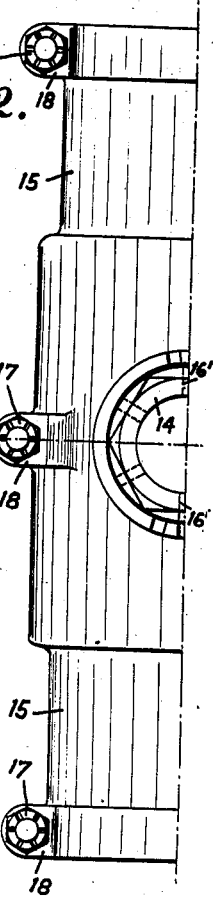
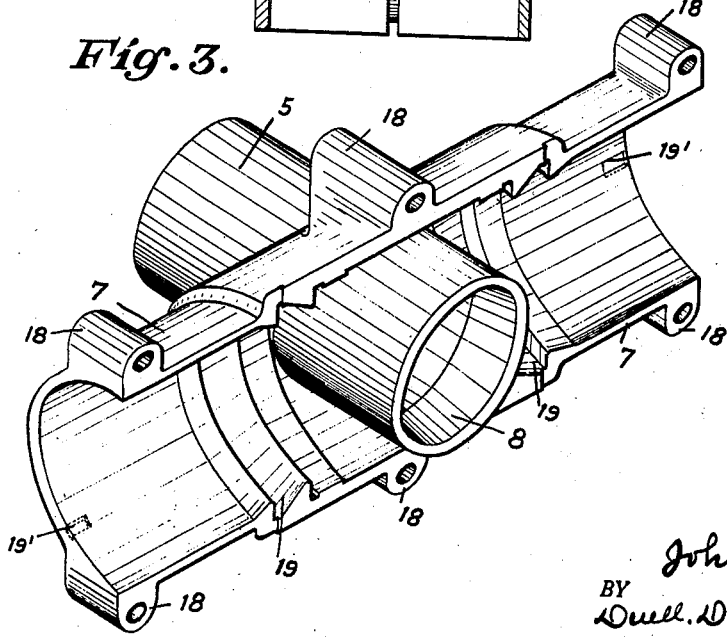
INVENTOR.
John W. Smith
BY Duell, Dunn & Anderson
ATTORNEYS.

Patented May 26, 1931

1,807,179

UNITED STATES PATENT OFFICE

JOHN W. SMITH, OF PHILADELPHIA, PENNSYLVANIA

PROPELLER HUB

Application filed July 24, 1928. Serial No. 295,020.

This invention relates to a propeller hub primarily intended for use in connection with aeronautical propellers.

It is an object of the invention to provide a device of this character, the parts of which will be relatively few in number and individually simple and rugged in construction, these parts being capable of being manufactured readily to provide a hub which will stand up in use and be capable of being produced at a relatively nominal figure.

A further object of the invention is that of furnishing a hub with which blade portions may be associated readily and which hub will embody an extremely strong structure.

An additional object is that of furnishing a hub assembly which, if desired, may, together with the blades, be detached as one unit from the drive shaft.

A still further object of the invention is that of providing a hub which may be applied to the drive shaft in such a manner that there will be no likelihood of relative movement occurring between these parts.

With these and further objects in mind reference is had to the attached sheet of drawings illustrating one practical embodiment of the invention and in which:—

Figure 1 is a partly sectional side view of a hub assembly and also showing portions of the drive shaft to which the same is applied.

Fig. 2 is a front view thereof, and

Fig. 3 is a perspective view of the hub.

In these views the numeral 5 indicates a tube which is coupled to a drive shaft 6 and from which there extends radially a pair of semi-cylindrical sleeve portions 7. These portions are integral with the tube and the latter projects materially beyond the forward edges of the sleeve portions and has its inner face terminating in an inclined surface 8. Furthermore, it will be observed that the inner face of the tube adjacent its opposite end is flared outwardly, as has been indicated at 13 and the tapered bore thus presented is divided into a plurality of faces as, for example, to present an octagonal tapered portion. Likewise, as shown, the drive shaft 6 adjacent the point at which it bears against this part of the inner face of the tube, is tapered as at 13' and this portion of the tube is divided into a plurality of faces corresponding, in number and area, to those of the tube.

Thus, in order to secure this hub portion to the driving or crank shaft it is simply necessary to introduce the latter into the tube 5 and thereupon to interpose, for example, a wedge-shaped bushing or collar 9 between the inclined surface 8 and the outer end of the shaft, which may be reduced at this point, if desired, as has been indicated at 10. Thereupon, a bolt 11 has its threaded shank introduced into the forward end of the shaft 6 and the head 12 of this bolt will bear against the outer edge of the element 9 to wedge the same in cooperation with the surface 8 against the end portion of the shaft and to draw the entire hub assembly rearwardly to a point at which the tapered portion of the shaft bears against the correspondingly flared part of the tube with the faces of these elements in intimate contact.

It is thus obvious that the hub will be locked against any possibility of movement with respect to the shaft and with a view to operating the bolt the head of the latter may be extended, as has been indicated at 14, to project materially beyond the forward end of the sleeve portion 15, which latter, with this in view, is conveniently formed with an opening 16. Furthermore, if desired, relative movement between the bolt and the hub assembly may be precluded by, for example, providing the extension 14 with an opening 16' for the introduction of a locking bolt (not shown).

The sleeve portion 15 is complementary to the sleeve portion 7 and these parts may be retained against separation as, for example, by bolts and nuts 17 which pass through boss portions 18. The interiors of the sleeve portions may be formed with buttress threads 19 or any other desired expedient may be resorted to, to retain the inner ends of the blades against movement. Furthermore, if desired, in order to set these blades properly with respect to the hub assembly, gauge marks may be provided or, as has been indicated in dotted lines in Fig. 3, recesses 19 may be formed in the inner face of one of the sleeve portions, for example 7, which recesses accommodate raised portions forming an integral part of the blades to achieve the desired result.

It is obvious that with a construction of this nature the entire hub assembly, together with the blades carried thereby, may be removed readily from the drive shaft if it is desirable to do so. Likewise, blades may be replaced without detaching the hub from the shaft and, furthermore, a hub assembly is furnished which will be of extremely strong construction.

Finally, it will be apparent, by means of the polygonal tapered fit between the shaft and the hub, that there will be no likelihood of relative rotation and that, despite the simple construction employed, it will be unnecessary to utilize a key or splines.

Thus, among others, the several objects aforementioned are achieved. It is obvious, however, that numerous changes in construction and rearrangement of the parts might be resorted to without departing from the spirit of the invention as described in the following claims.

Having described my invention what I claim as new and desire to secure by Letters Patent is:—

1. A one-piece propeller hub to receive a drive shaft and a pair of complementary members associated with said hub for gripping the inner ends of blade portions, one of said members forming an integral part of said hub, the second member being formed with an opening, and means comprising a wedge collar cooperating with said shaft and hub to prevent relative movement thereof, and said means being accessible through said opening.

2. A one-piece propeller hub to receive a drive shaft and a pair of complementary members associated with said hub for gripping the inner ends of blade portions, one of said members forming an integral part of said hub, the second member being formed with an opening, means comprising a wedge collar and a flanged bolt cooperating with said shaft and hub to prevent relative movement thereof, and said means being accessible through said opening and extending beyond the same, means whereby said last named means may be secured against movement with respect to said last named member and means for securing such member to the member which forms a part of said hub.

3. In combination, a pair of substantially semi-circular, complementary sleeve portions, a hub to receive a drive shaft, one of said portions being integral with said hub and the other of the same being formed with an opening in line with the axis of said hub, and wedge locking means cooperating with the outer end of said hub and accessible, through said opening, to secure said hub against movement with respect to a shaft disposed therein.

4. A device of the character described, including, in combination, a one-piece propeller hub to be mounted on a drive shaft, means comprising a wedge collar and flanged bolt for locking said hub against movement with respect to said shaft, means associated with said hub and to detachably receive the ends of propeller blades, and further locking means independent of said hub locking means whereby said blades may be detached from said blade receiving means without detaching the said hub from said shaft.

5. A device of the character described including, in combination, a hub to be coupled with a drive shaft, means comprising a wedge collar associated with said hub for locking the same against movement with respect to said shaft, a shell fixed with respect to said hub and to receive the ends of propeller blades, a cap, means for detachably securing said cap to said shell to retain said blades against movement with respect to said hub, said securing means being independent of said locking means whereby said cap may be removed without disturbing the relationship between said hub and shaft.

6. A device of the character described including, in combination, a propeller hub to receive a drive shaft, means comprising a wedge member rendered more effective by the pull of the propeller when in use for locking said hub against movement with respect to said shaft, a socket shell extending from said hub, a cap complementary to said shell, means for detachably retaining said cap applied with respect to said shell and said retaining means being independent of the means for locking said hub with respect to said shaft, and flange portions complementary to each other and forming parts of said shell and cap, said flange portions being adapted for extension into recesses forming a part of the ends of propeller blades received between said shell and cap and to be retained thereby when the latter is in position upon the former.

7. A device of the character described including, in combination, a propeller hub to receive a drive shaft, wedge means for locking said hub against movement with respect to said shaft, a substantially semi-cylindrical socket shell extending from said hub, a semi-cylindrical cap complementary to said shell, means for detachably retaining said cap applied with respect to said shell and said retaining means being independent of the means for locking said shaft, and annular flange portions complementary to each other and forming parts of said shell and cap, said flange portions being adapted for extension into recesses forming a part of the ends of propeller blades received between said shell and cap and to be retained thereby when the latter is in position upon the former.

8. In combination, an inner semi-cylindrical member, an outer semi-cylindrical member, the semi-cylindrical members being adapted to detachably grip the inner ends of a plurality of propeller blades and forming together a substantially complete tube portion, a shaft sleeve extending through the inner semi-cylindrical member and being formed integral and homogeneous therewith, the shaft sleeve terminating within said tube, a drive shaft extending into the shaft sleeve, first fastening means for securing the shaft sleeve to the drive shaft, the outer semi-cylindrical member being formed with an opening to permit passage of said first fastening means, and second fastening means to secure the two semi-cylindrical members together, the parts being so arranged that the outer semi-cylindrical member can be removed without disturbing the first fastening means.

In testimony whereof I affix my signature.

JOHN W. SMITH.